(No Model.) 2 Sheets—Sheet 1.

T. J. GLOVER.
BICYCLE LOCK.

No. 431,457. Patented July 1, 1890.

Witnesses: J. F. Theo. Lang
Edward J. Hemrick

Inventor:
Truman J. Glover
by his attorneys
Mason, Fenwick and Lawrence

THE NORRIS PETERS CO., PHOTO-LITHO., WASHINGTON, D. C.

(No Model.) 2 Sheets—Sheet 2.
T. J. GLOVER.
BICYCLE LOCK.
No. 431,457. Patented July 1, 1890.
Fig 7.
Fig 8.
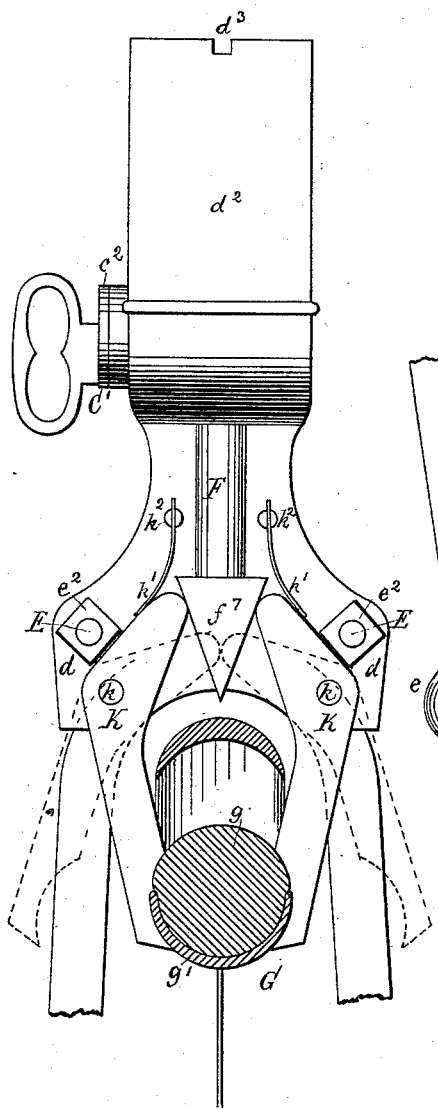
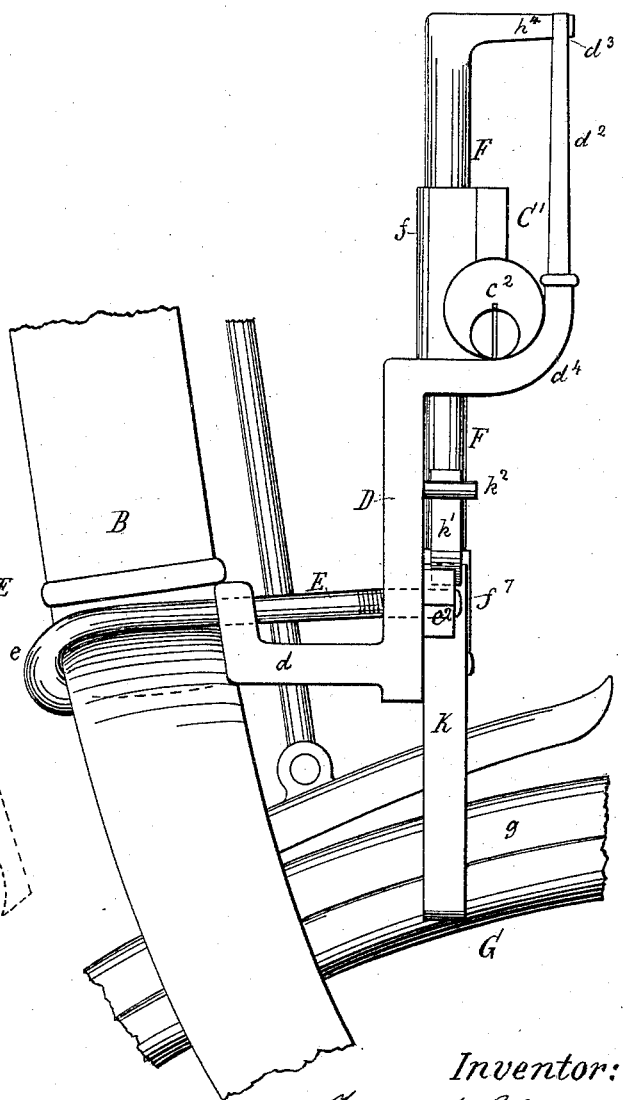
Witnesses:
Inventor:

UNITED STATES PATENT OFFICE.

TRUMAN J. GLOVER, OF WASHINGTON, DISTRICT OF COLUMBIA.

BICYCLE-LOCK.

SPECIFICATION forming part of Letters Patent No. 431,457, dated July 1, 1890.

Application filed March 26, 1890. Serial No. 345,404. (No model.)

*To all whom it may concern:*

Be it known that I, TRUMAN J. GLOVER, a citizen of the United States, residing at Washington, in the District of Columbia, have invented certain new and useful Improvements in Bicycle-Locks; and I do hereby declare the following to be a full, clear, and exact description of the invention, such as will enable others skilled in the art to which it appertains to make and use the same.

My invention relates to bicycle-locks; and it consists in certain novel constructions, combinations, and arrangements of parts, as will be hereinafter fully described and claimed, whereby the wheel of a bicycle, together with such adjuncts as a lamp or tool-box, can be instantly and simultaneously locked, thereby preventing a person without a key to said lock riding away with the machine, and also preventing theft of said lamp and oil-box and tools from said box.

Figure 1:
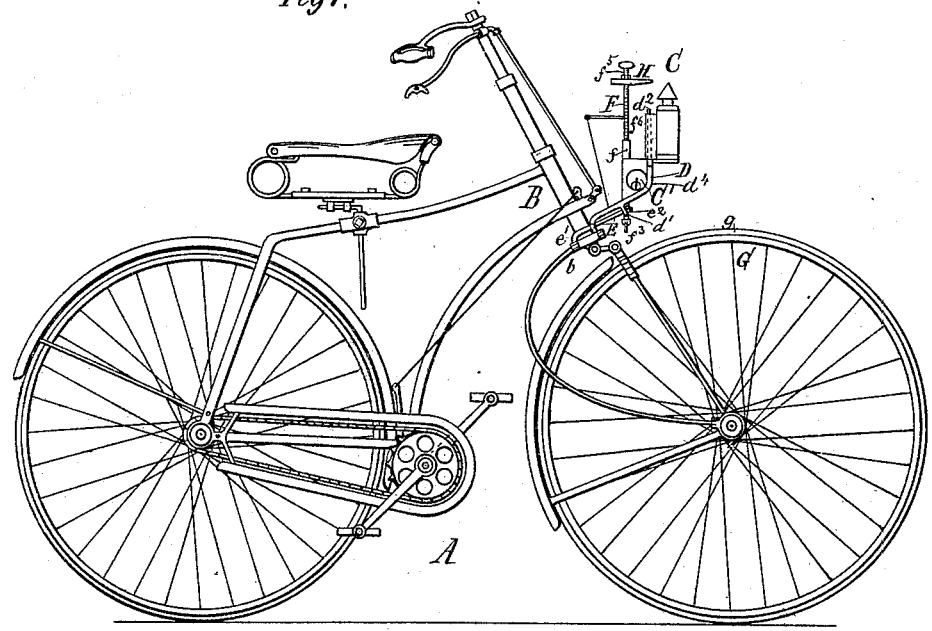
Figure 4:
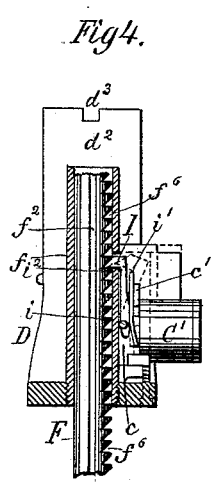
Figure 5:
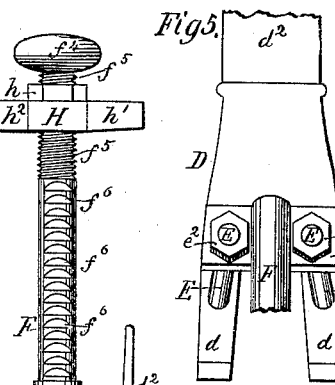
Figure 3:
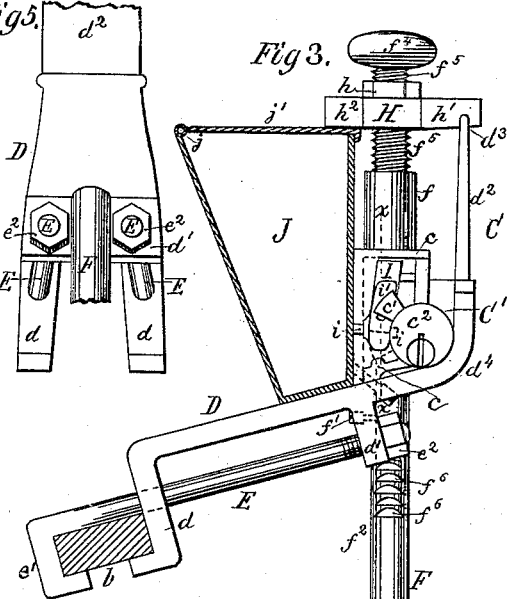
Figure 2:
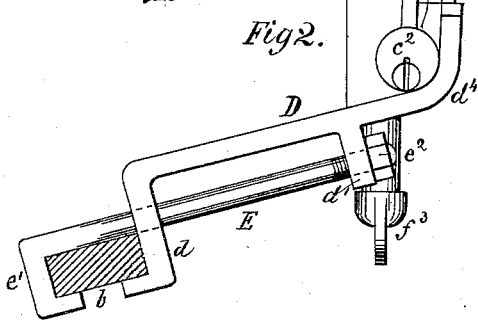
Figure 6:

In the accompanying drawings, Figure 1 is a side elevation of a bicycle equipped with my improved lock. Fig. 2 is an elevation of the lock, and showing means for securing the same to the bicycle-frame, the lock being unlocked, and a locking and brake bolt being shown in its most elevated position. Fig. 3 is an elevation of the same in locked condition. Fig. 4 is a detail section in the line $x$ $x$ of Fig. 3. Fig. 5 is a broken end view of the lock-bracket and part of the brake and locking bolt. Fig. 6 is a detail perspective view of the barrel of a Yale or other lock and a pawl. Fig. 7 is a detail side elevation of a modified construction of my lock, and Fig. 8 is a front view of the same.

The letter A in the drawings represents an ordinary bicycle, B its head, and C my improved safety locking mechanism. The lower T-shaped portion $b$ of the head B is provided with a bracket D, which carries the lock proper C′, and which is fastened to said portion by means of two angular legs $d$, formed with it, and two hooked screw-bolts E. The hook portions $e'$ of the bolts E clasp the rear part of the portion $b$, and the bolts are then passed through the legs $d$ and through an angular flange $d'$ of the bracket D, which is clamped by means of nuts $e^2$ on the bolt ends. In front of the flange $d'$ the bracket D is turned up to form a lamp-holder $d^2$, the top portion of which is provided with a notch $d^3$, as shown.

At the bend $d^4$ of the bracket, below the lamp-holder, an ordinary Yale or other safety lock proper C′ is fastened by suitable means, and in rear of said lock a tubular guide $f$ is arranged. In this tubular guide a bolt F is fitted, which passes through the bracket and the central portion of the angular flange $d'$, so that it stands between the nuts $e^2$ and prevents them from turning. The angular flange $d'$ is provided with a screw or pin $f'$, the end of which bears in a longitudinal groove $f^2$ of the bolt, this being a construction well known to all skilled mechanics. Therefore no special illustration, aside from the dotted outlines in Fig. 3, is shown. The bolt F might be made square and fitted in a square of the tubular guide $f$. The lower end of the bolt F is provided with a bifurcated termination, which may be a winged nut $f^3$, which, by being pressed down upon the tire $g$ of the wheel G of the bicycle, so as to straddle it, and locked, will prevent the wheel from turning. The top of the bolt F is provided with a button $f^4$, by means of which it can be conveniently moved up and down. Below the button $f^4$ a screw-thread $f^5$ is provided on the bolt F, to which a common nut $h$ and a nut H with two radial arms $h'$ $h^2$ are screwed, and upon which the nut H can be adjusted to a suitable elevation, while the nut $h$ serves as a jam-nut in keeping the nut H in place. The arm $h'$ of the nut stands in line with the notch $d^3$ of the lamp-holder $d^2$, and it enters the same when the bicycle is locked, and thus prevents it being turned. Below this threaded portion a number of ratchet-teeth $f^6$ are provided on the bolt F, which engage with a spring-pawl I. This spring-pawl is hung by means of trunnions $i$ in the lock-frame $c$ of the lock proper C′, and is at its back provided with a curved spring $i'$ and at its end with a pawl head or hook $i^2$, which latter passes through the wall of the lock-frame $c$ and through the tubular guide $f$ into the ratchet-teeth $f^6$ of the bolt F. The lock proper C′ is provided with a vibrating arm $c'$, which is fastened to the barrel $c^2$ of the lock proper C′ and is moved by the key of the lock simultaneously with the barrel. When the lock C′ is unlocked, the arm $c'$ bears upon the lower portion of the spring $i'$, as seen in dotted lines in Fig. 3, and when the lock is locked the arm bears upon the upper portion of the spring $i'$. In the first case the pawl is held away from the ratchet-teeth $f^6$, and the bolt F can be freely moved either up or down, and in the second case the pawl is held toward the bolt, and the bolt can be moved down until the bifurcated terminus or winged nut $f^3$ comes in contact with the tire $g$ of the wheel G.

In Fig. 3 I have shown a tool-box J or other receptacle in section, secured to the bracket D in rear of the tubular guide $f$, said box or receptacle being provided with a top $j$, which is hinged at $j'$ to the rear portion of the tool-box, while its front portion, when the lock is locked, is held down upon the tool-box by the arm $h^2$ of the nut H. I contemplate having the tool-box or other receptacle J of metal lined with some suitable soft material, thus preventing the tools in said box being removed by cutting the box when the lid has been locked. The shape of the bracket D may be modified to suit the requirements of the different types of bicycles in use without departing from my invention.

In bicycles which have the brake below the head the bifurcated terminus or winged nut $f^3$ will be substituted by a triangular nut $f^7$, which operates two curved brake-levers K, pivoted at $k$ to the bracket, and with their lower arms embracing the tire $g$ and rim $g'$ of the wheel G. Two springs $k'$, fastened to studs $k^2$ in the bracket, serve to hold the upper arms of the levers K together and the lower arms apart and away from the felly of the wheel when the bicycle is unlocked. When the bicycle is locked, the upper arms of the levers K stand in a position to prevent the turning of the nuts $e^2$, as shown.

When the bicycle is in use, the bolt F is held above the wheel, as shown in Fig. 2, by means of the pawl I catching into one of the ratchet-teeth $f^6$, the spring $i'$ being strong enough to prevent the ratchet-teeth from slipping past the pawl by reason of jolting of the wheel.

In practice I contemplate making the lock proper C', guide $f$, and bracket D in one piece, whereby a unique appearance is secured and liability of separation and breakage of parts avoided, together with cheapness of production attained. I also contemplate substituting a hook and eye for the button $f^4$ or forming on the bolt F a cross-handle, or the button may be omitted and the nut H employed, or the bolt may be terminated with an arm $h^4$, answering to arm $h'$ of the nut H, for locking down the lamp, and with another arm, (not shown,) answering to the arm $h^2$ of the nut H, for locking down the top of the tool-box. The notch $d^3$ is very useful; but it is obvious that it might be dispensed with, as it is only necessary that the arms $h'$ $h^2$ be brought down far enough to touch the top of the tool-box and the top of the lamp-holder in order to prevent the removal of the latter and the swinging up of the former.

What I claim as my invention is—

1. In a bicycle attachment, in combination, a brake-bolt F, adapted to be adjusted vertically and locked upon a bicycle-wheel, a lock, a support for said bolt and lock, and connecting means between the brake-bolt and lock for holding the bolt at different altitudes, substantially as described.

2. In a bicycle, in combination, a bicycle-head, a bracket, a vertically-adjustable locking and brake bolt F, applied so as to slide and not turn and provided with an arm $h'$, a pawl I, and a lock proper C', having a suitable pawl-actuating arm and a lamp-holder, substantially as described.

3. In a bicycle, in combination, a bicycle-head, a bracket D, bolts E, nuts $e^2$, vertically-adjustable bolt F, a lock C', having a suitable pawl-actuating arm, and a pawl I, substantially as described.

4. In a bicycle, in combination, a bicycle-head, vertically-adjustable locking-bolt F, armed nut H, and the bracket D, having tool-box with lid $j'$, substantially as described.

5. In a bicycle, in combination, a bicycle-head, vertically-adjustable bolt F, a lock, nut H, having arms $h'$ $h^2$, and the bracket D, having a lamp-holder, and tool-box with lid $j'$, substantially as described.

6. The combination, with a bicycle-wheel and a support on the frame of the bicycle, of a locking-bolt for holding the wheel from turning when the bicycle is not in use, and a locking mechanism for locking said bolt and the lamp in its position, substantially as described.

7. The combination, with a bicycle-wheel and support on the frame of the bicycle, of a locking-brake device for holding the wheel from turning when the bicycle is not in use, and a locking mechanism for locking said brake device and the lamp, substantially as described.

In testimony whereof I hereunto affix my signature in presence of two witnesses.

TRUMAN J. GLOVER.

Witnesses:
L. L. APPLE,
E. T. FENWICK.